United States Patent
Provaznik et al.

(10) Patent No.: US 11,472,644 B2
(45) Date of Patent: Oct. 18, 2022

(54) SYSTEM AND METHOD FOR ALIGNING ENTRY SNOUT OF A BARRIER TRANSFER MACHINE WITH ROAD BARRIERS

(71) Applicant: LINDSAY TRANSPORTATION SOLUTIONS, LLC, Omaha, NE (US)

(72) Inventors: Richard Edward Provaznik, Omaha, NE (US); Matthew A. Elmore, Sacramento, CA (US)

(73) Assignee: LINDSAY TRANSPORTATION SOLUTIONS, LLC, Omaha, NE (US)

( * ) Notice: Subject to any disclaimer, the term of this patent is extended or adjusted under 35 U.S.C. 154(b) by 152 days.

(21) Appl. No.: 16/912,066

(22) Filed: Jun. 25, 2020

(65) Prior Publication Data
US 2021/0403256 A1 Dec. 30, 2021

(51) Int. Cl.
*B65G 67/12* (2006.01)
*E01F 13/02* (2006.01)

(52) U.S. Cl.
CPC .............. *B65G 67/12* (2013.01); *E01F 13/02* (2013.01); *B65G 2814/0311* (2013.01)

(58) Field of Classification Search
CPC .... B65G 67/12; B65G 2814/011; E01F 13/02
See application file for complete search history.

(56) References Cited

U.S. PATENT DOCUMENTS

| 5,549,412 | A | 8/1996 | Malone |
| 11,013,646 | B2* | 5/2021 | Carletti ................ A61G 3/0272 |
| 2014/0255096 | A1 | 9/2014 | Schmidt |
| 2019/0112164 | A1* | 4/2019 | Yuan ........................ B60P 1/162 |
| 2019/0309491 | A1* | 10/2019 | Sherony .............. E01F 15/0461 |

FOREIGN PATENT DOCUMENTS

| CN | 207260024 | 4/2018 |
| CN | 210063200 | 2/2020 |
| WO | 2019086842 | 5/2019 |

OTHER PUBLICATIONS

International Search Report and Written Opinion for PCT Appln. No. PCT/US2021/038353, dated Sep. 27, 2021 and all referenced cited therein.

* cited by examiner

*Primary Examiner* — Saul Rodriguez
*Assistant Examiner* — Ashley K Romano
(74) *Attorney, Agent, or Firm* — Hovey Williams LLP

(57) ABSTRACT

A barrier transfer machine includes a moveable chassis, an entry snout, an exit snout, a conveyor system, and a control system that aligns the entry snout with road barriers before the road barriers are picked up. The control system includes a barrier position sensor; an entry snout position sensor; and a processing system.

20 Claims, 17 Drawing Sheets

SYSTEM AND METHOD FOR ALIGNING ENTRY SNOUT OF A BARRIER TRANSFER MACHINE WITH ROAD BARRIERS

BACKGROUND

Moveable road barrier systems are often placed on roadways to create traffic barriers between opposing lanes of traffic. Unlike permanent barriers, moveable road barrier systems may be picked up and repositioned by barrier transfer machines to make more efficient use of space, increase vehicle capacity, and reduce traffic congestion. For example, a barrier transfer machine may move a road barrier system back and forth between lanes of a roadway throughout the day to provide more lanes in directions of peak traffic and/or to create work zone space for construction crews.

A typical barrier transfer machine includes a moveable chassis; an entry snout supported on a forward end of the chassis for picking up road barriers from a road surface; an exit snout positioned on a rearward end of the chassis for placing the road barriers back onto the road surface; and a conveyor system positioned below the chassis for transporting the road barriers from the entry snout to the exit snout.

The entry snout must be aligned with and generally centered over the road barriers before they are picked up or else the barriers will rub against the carrier wheels on the entry snout, causing wear and damage to the entry snout and the barriers. To this end, an operator must steer the barrier transfer machine to align the entry snout with the barriers and simultaneously adjust the lateral position of the entry snout relative to the barrier transfer machine to precisely align it with the barriers. Unfortunately, these maneuvers are difficult in any situation and especially so when the barrier transfer machine is operating at high speeds and/or alongside heavy traffic or when it is driven by an inexperienced operator.

SUMMARY

The present invention solves the above-described problems and related problems and provides a distinct advance in the art of road barrier transfer machines. More particularly, the invention provides a road barrier transfer machine that includes a control system for aligning the machine with road barriers before the barriers are picked up.

A barrier transfer machine constructed in accordance with an embodiment of the invention broadly comprises a moveable chassis, an entry snout, an entry snout positioning mechanism, an exit snout, a conveyor system, and the above-mentioned control system.

The chassis has two ends and rides on wheels, belts, or other ground-engaging traction elements that are driven by conventional engines, transmissions, and associated mechanical and electrical components. The machine can be driven in either direction. In one embodiment, two operator cabs are supported on the chassis, one at each end of the chassis, but embodiments of the machine may have only one operator cab or even no cab at all. As used herein, the end of the machine currently picking up barriers is referred to as the "forward end" or "front end", and the end of the machine placing the barriers back down is referred to as the "rear end".

Either snout can pick up and drop off barriers, depending on the direction of travel of the machine. As used herein, the snout currently in front is referred to as the "entry snout", and the snout currently in the back is referred to as the "exit snout".

The entry and exit snouts include a blunderbuss that acts as a guide for the barriers as they enter or exit the machine and a number of bogey assemblies with carrier wheels that pick-up and carry the barriers towards the conveyor or place the barriers back down after being conveyed through the machine. The entry snout positioning mechanism is coupled with the entry snout for shifting the entry snout generally laterally with respect to the longitudinal axis of the chassis.

The conveyor system extends beneath the chassis and transports the road barriers from the entry snout to the exit snout.

In accordance with important aspects of the invention, the control system aligns the entry snout with the barriers before the barriers are picked up so that the barriers don't rub against the carrier wheels on the entry snout or otherwise cause wear and damage to the entry snout and/or the barriers themselves. An embodiment of the control system broadly comprises a barrier position sensor; an entry snout position sensor; and a processing system. The control system may be a stand-alone system or may be incorporated in other control systems of the barrier transfer machine.

The barrier position sensor senses a position of one of the road barriers (typically the forwardmost barrier) before the road barriers are picked up by the entry snout and generates corresponding barrier position data. In some embodiments, the barrier position sensor is a light detection and ranging (LIDAR) sensor and/or a radio detection and ranging (RADAR) sensor mounted on the entry snout. In other embodiments, the barrier position sensor may be a camera mounted on the entry snout or any other device or mechanism operable to sense the position or relative position of at least one of the barriers and generate corresponding position data. As used herein, the "position" of the barrier may be its geographical coordinates, its relative position with respect to the entry snout, and/or its angle with respect to the entry snout.

The entry snout position sensor senses a position of the entry snout before the road barriers are picked up and generates corresponding entry snout position data. In some embodiments, the entry snout position sensor is a proximity switch, a magnetic position sensor, a potentiometer, a mechanical resolver, a mechanical encoder, or any other sensor capable of sensing the position or relative position of the entry snout before the barriers are picked up. As used herein, the "position" of the entry snout may be its geographical coordinates, its relative position with respect to the barriers, and/or its angle with respect to the barriers.

The processing system compares the entry snout position data to the barrier position data to determine if the entry snout is aligned with the barriers before the barriers are picked up by the entry snout. In some embodiments, the processing system generates an alert if the entry snout is not aligned with the barriers and transmits the alert to a user interface in the barrier transfer machine so that an operator of the machine may correct any mis-alignment before the barriers are picked up. In other embodiments, the processing system controls the entry snout positioning mechanism to shift the entry snout laterally to correct any misalignment between the entry snout and the barriers before the barriers are picked up.

In still other embodiments, the processing system generates and transmits a steering signal to the user interface to prompt an operator to steer the barrier transfer machine to align the entry snout with the barriers. In other embodiments, the processing system generates and transmits a steering signal to an automatic steering mechanism to automatically steer the barrier transfer machine to align the entry snout with the barriers.

This summary is provided to introduce a selection of concepts in a simplified form that are further described in the detailed description below. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein.

Figure 1:
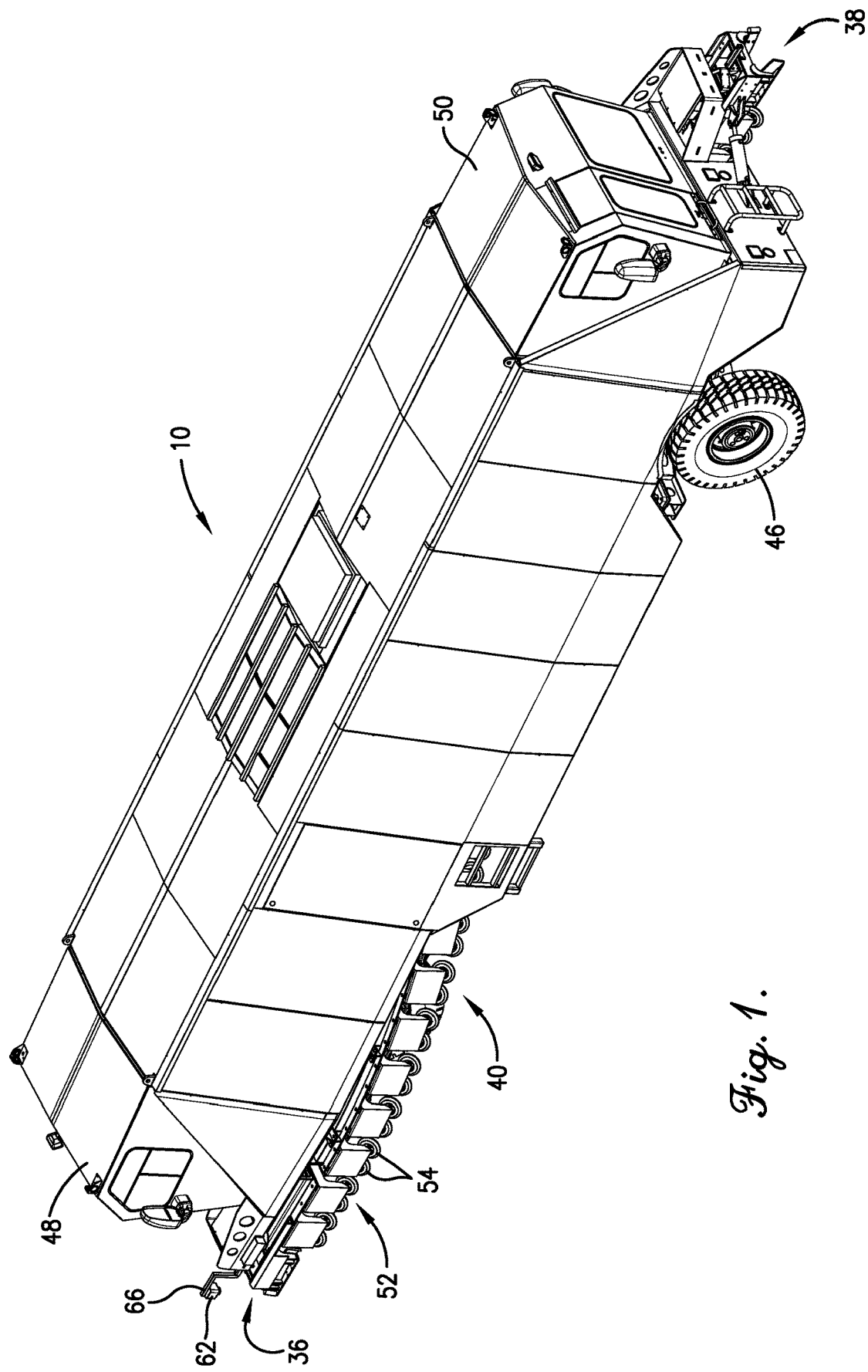
FIG. 1 is a top perspective view of a barrier transfer machine constructed in accordance with embodiments of the present invention.
Figure 2:
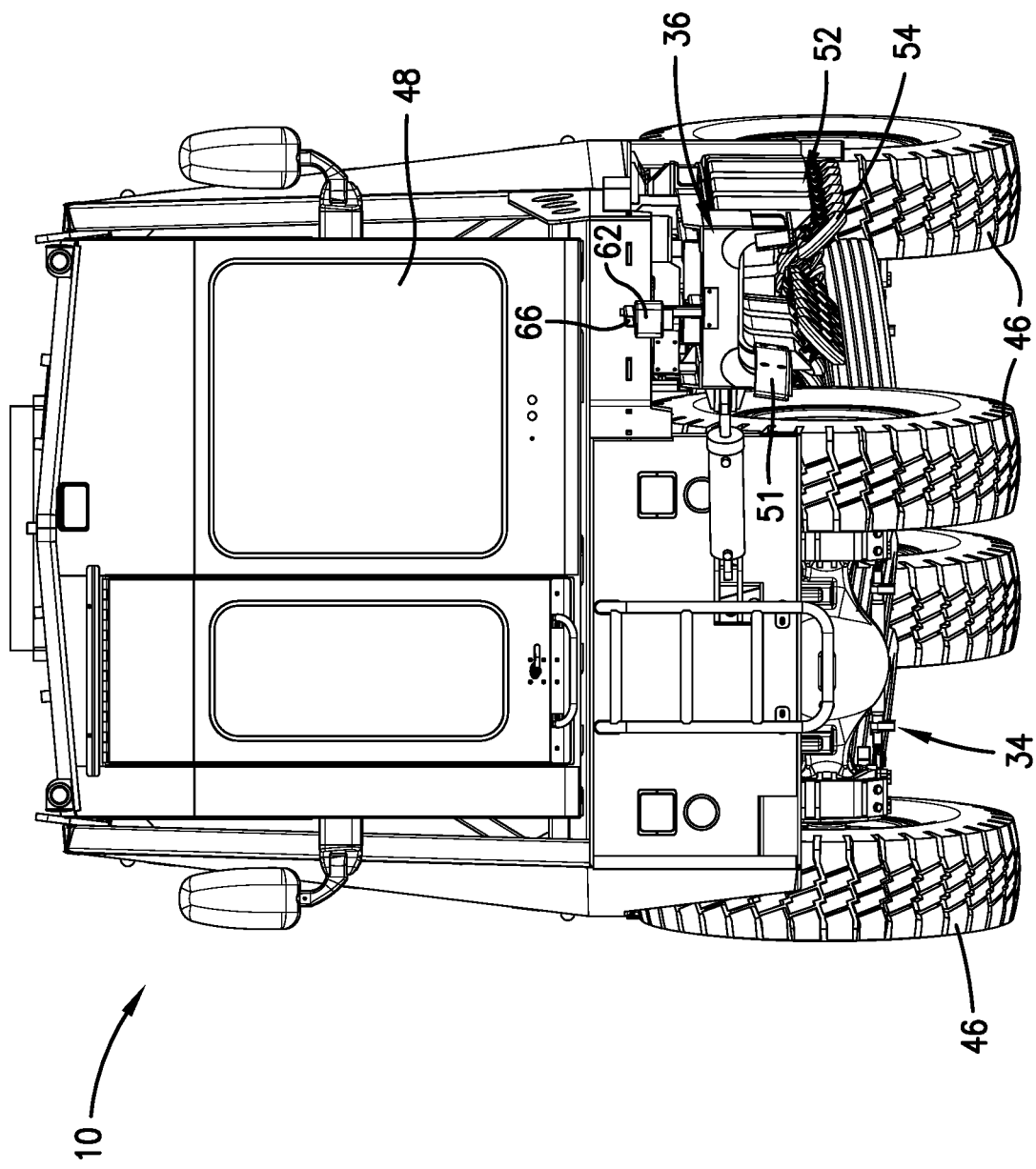
FIG. 2 is a front or rear view of the barrier transfer machine.
Figure 3:
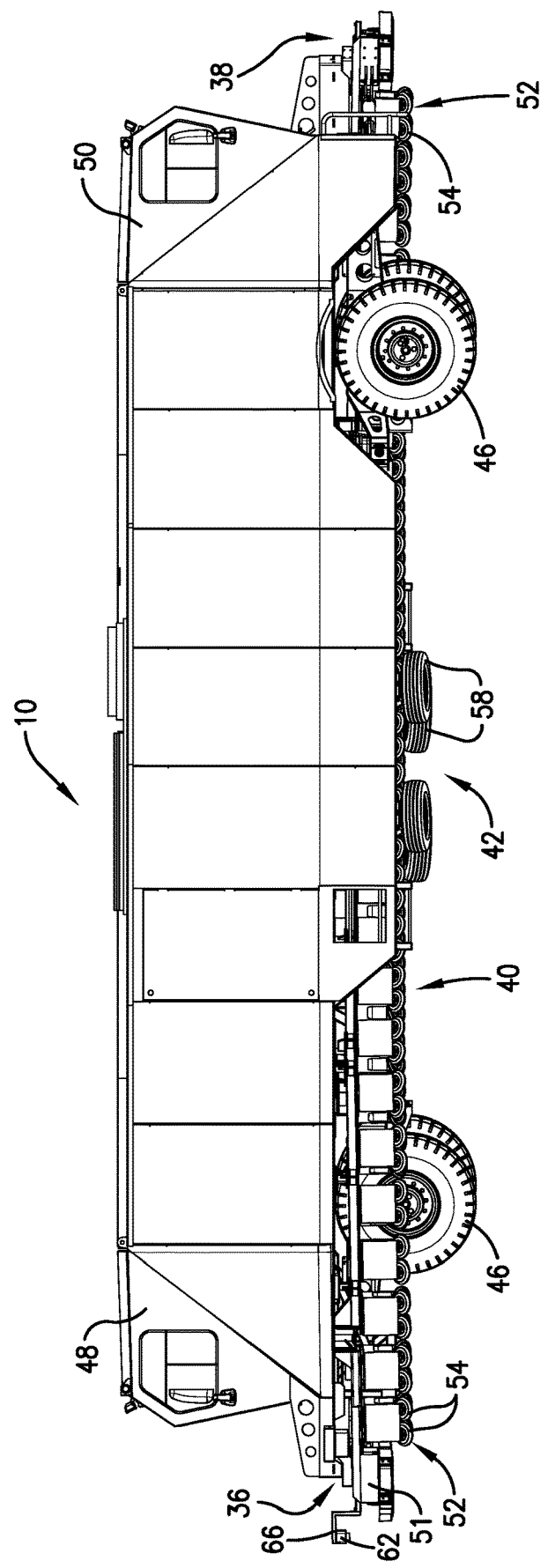
FIG. 3 is a side view of the barrier transfer machine.
Figure 4:
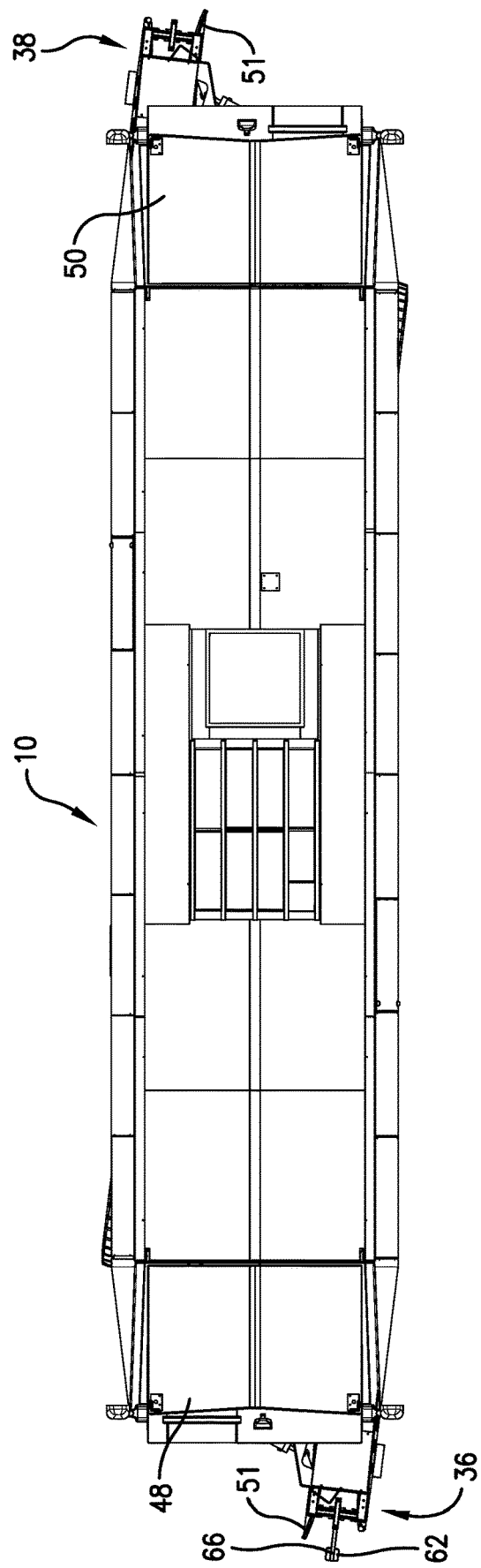
FIG. 4 is a top view of the barrier transfer machine.

The drawing figures do not limit the present invention to the specific embodiments disclosed and described herein. The drawings are not necessarily to scale, emphasis instead being placed upon clearly illustrating the principles of the invention.

DETAILED DESCRIPTION

Figure 6:
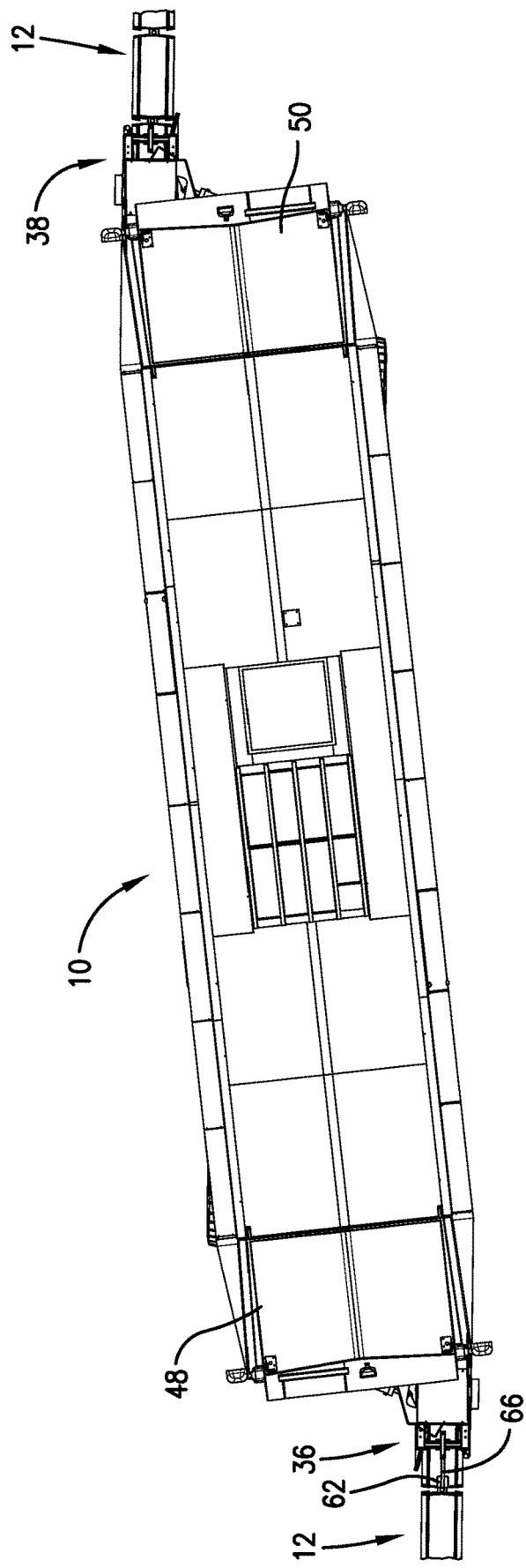
FIG. 6 is a top view of the barrier transfer machine shown moving a road barrier span from one side of a roadway to another side.
Figure 7:
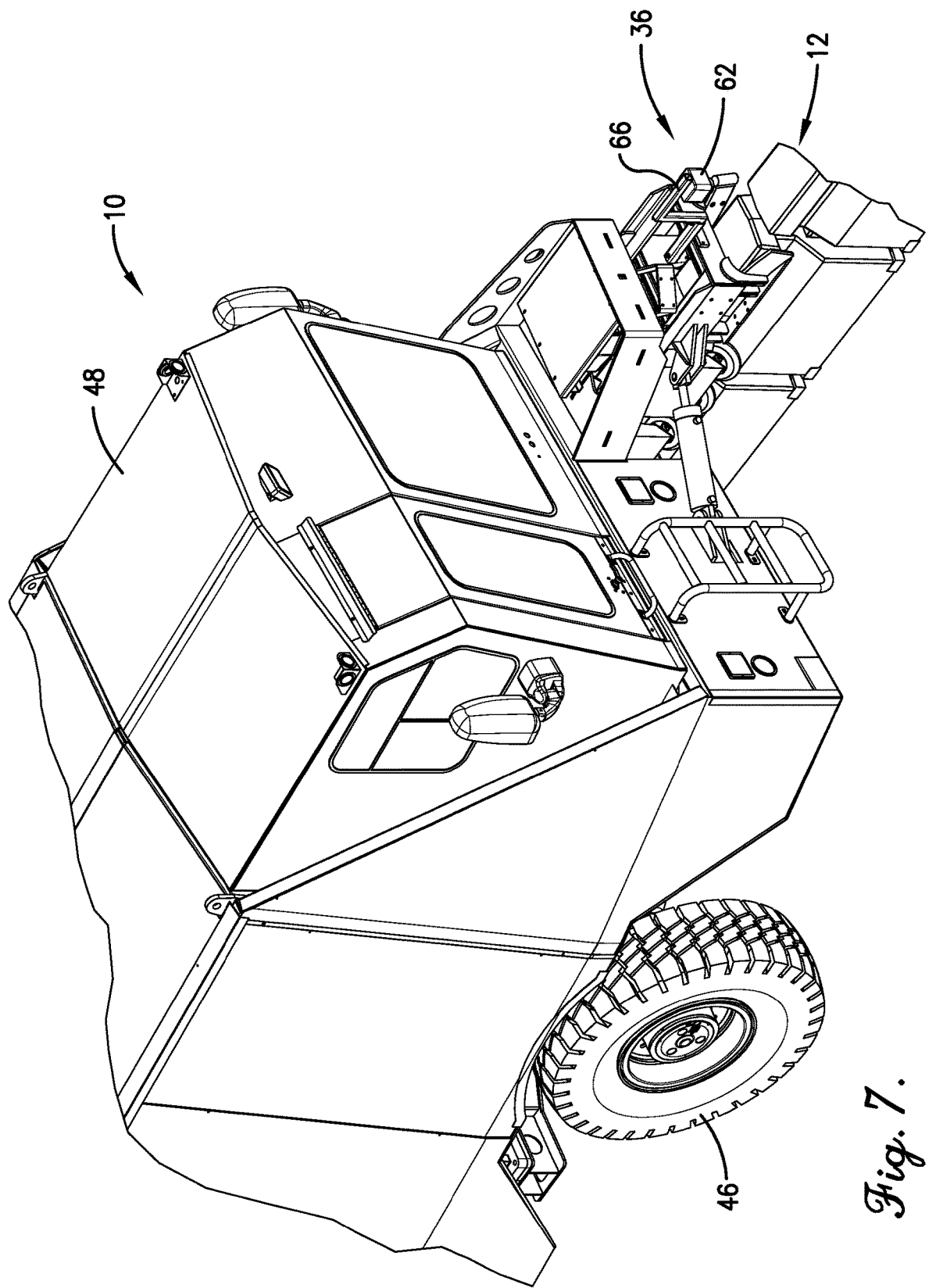
FIG. 7 is a fragmentary front perspective view of the barrier transfer machine shown picking up a span of road barriers.
Figure 8:
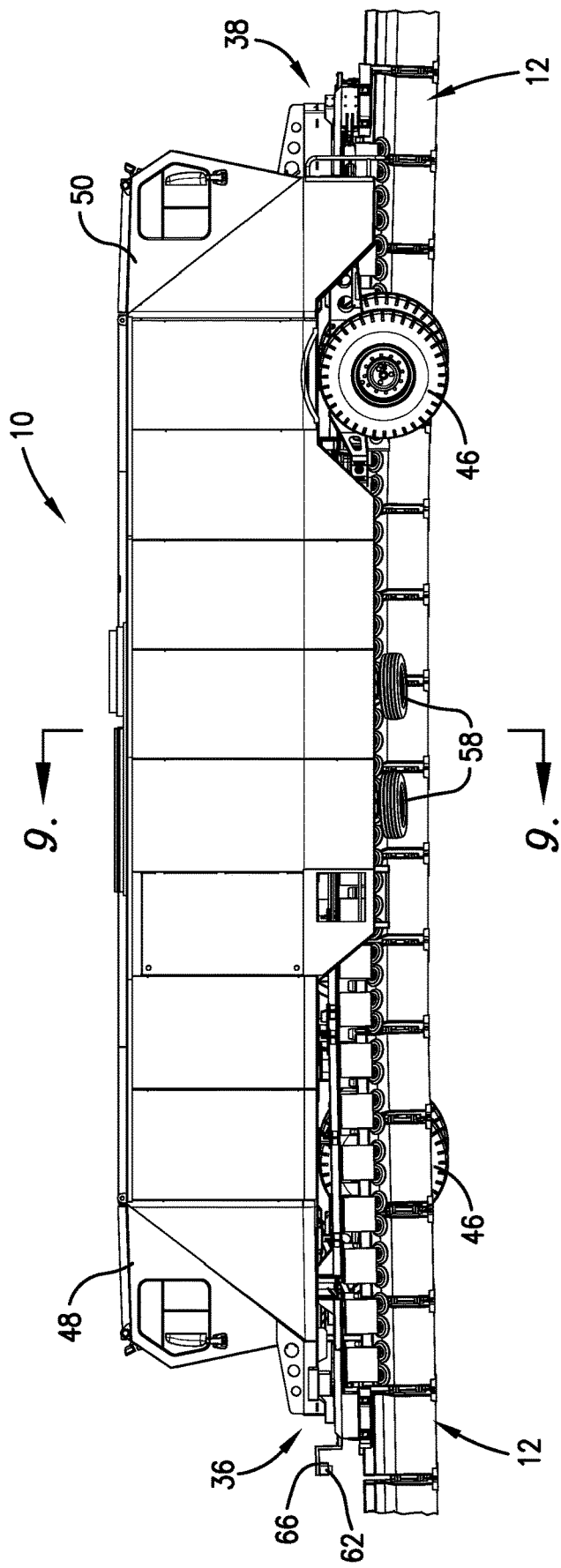
FIG. 8 is a side view of the barrier transfer machine shown picking up and repositioning a span of road barriers.

Turning now to the drawing figures, a barrier transfer machine 10 constructed in accordance with embodiments of the invention is depicted. As best shown in FIG. 6, the barrier transfer machine 10 is configured for picking up and repositioning a span 1 of interconnected road barriers 12 to provide more lanes in directions of peak traffic, to create work zone space for construction crews, or to otherwise make more efficient use of roadway space, increase vehicle capacity, and/or reduce traffic congestion. In accordance with important aspects of the present invention, and as described in more detail below, the barrier transfer machine includes a control system for aligning the machine with the barriers before the barriers are picked up to minimize or eliminate damage to the machine and/or the barriers caused by misalignments.

Figure 15:
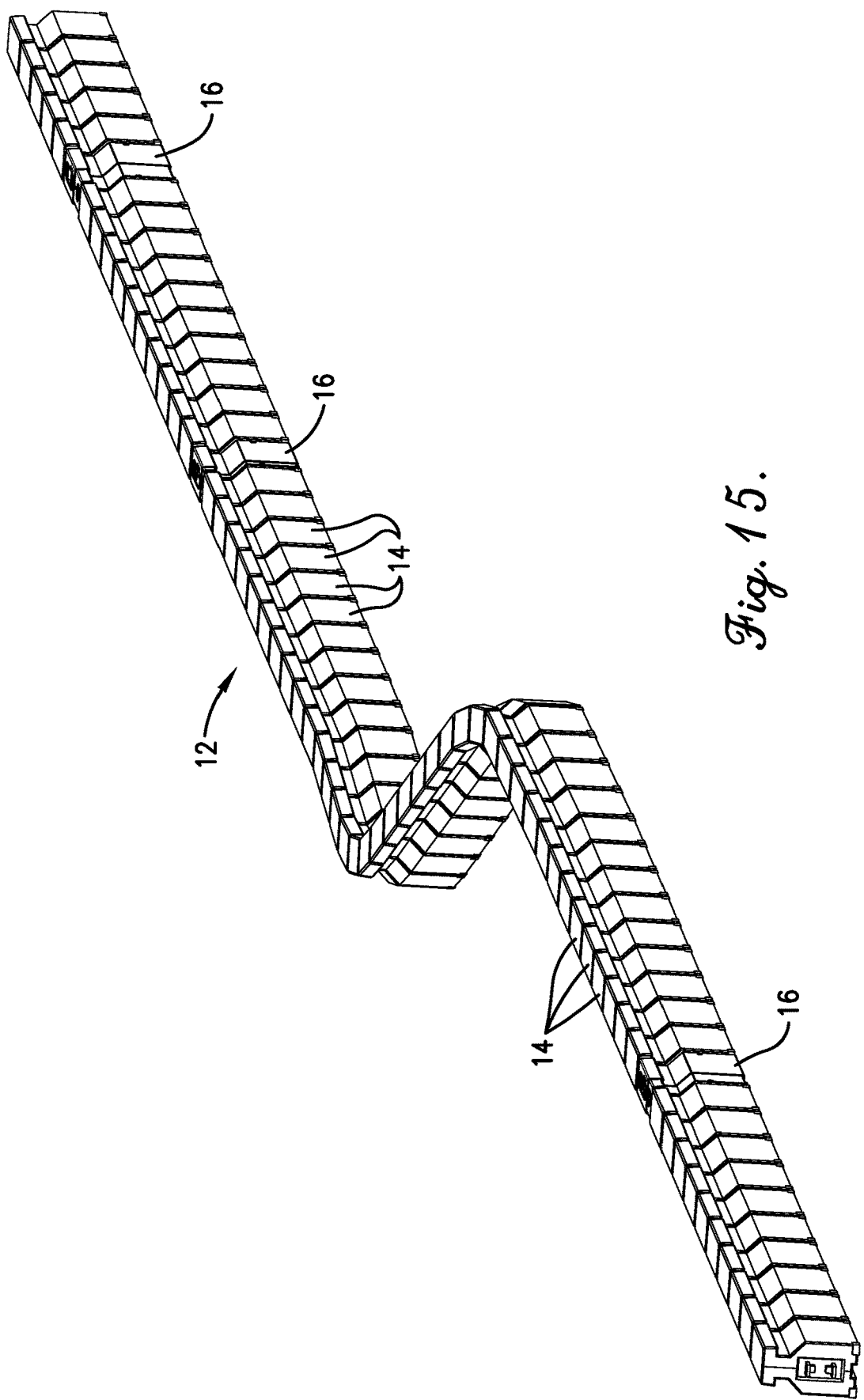
FIG. 15 is a perspective view of an exemplary road barrier span.

An exemplary span of road barriers 12 that may be picked up and repositioned by the barrier transfer machine 10 is depicted in FIG. 15. The span 12 may be any length and may include any number of fixed-length road barriers 14 and variable length barriers 16. In some embodiments, the barriers 14, 16 are connected end-to-end with steel pins and/or tensioning hinge mechanisms described in more detail below.

Figure 9:
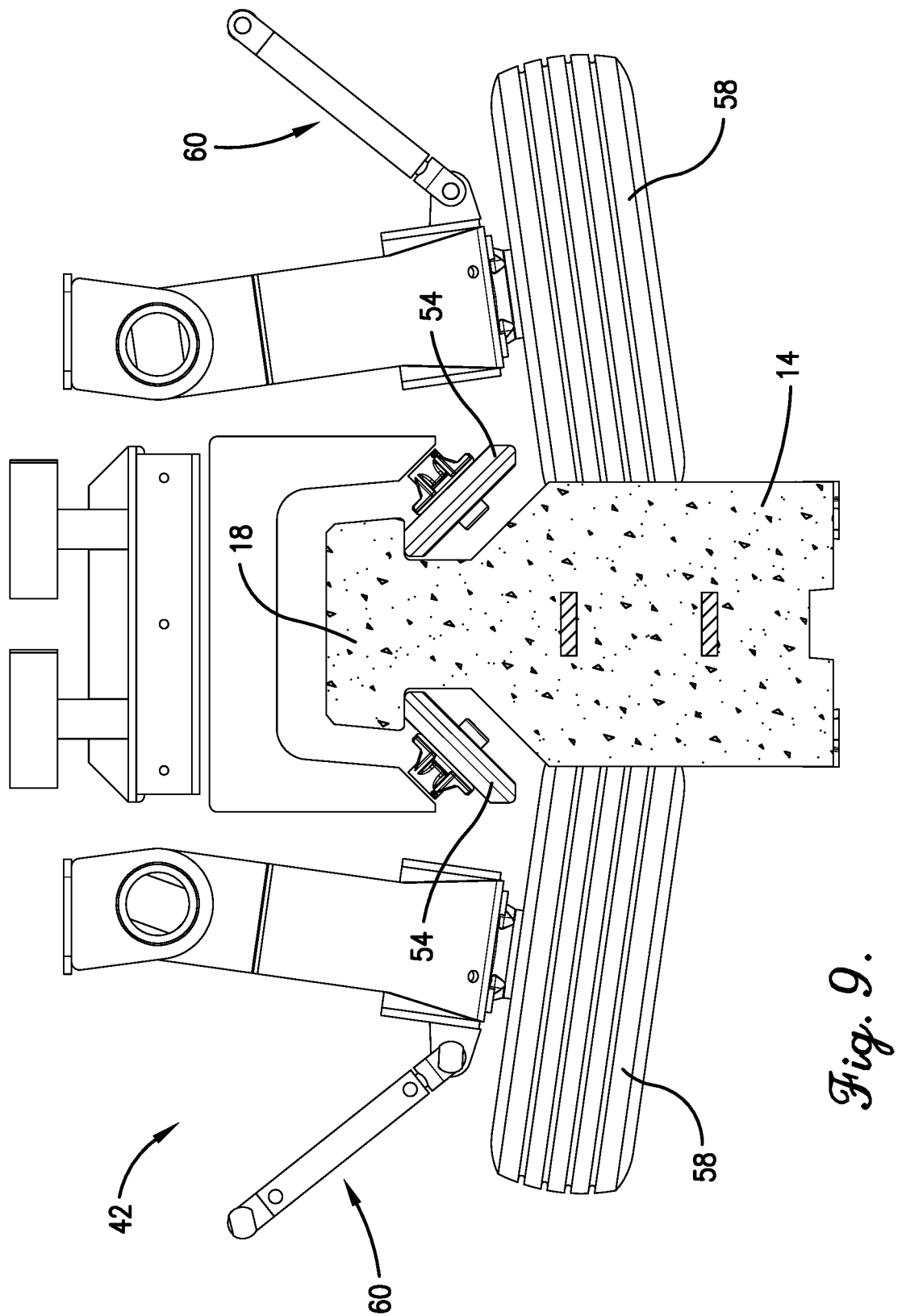
FIG. 9 is a vertical cross-sectional view of the barrier transfer machine taken along line 9/9 of FIG. 8 to better illustrate the capstan system.
Figure 10:
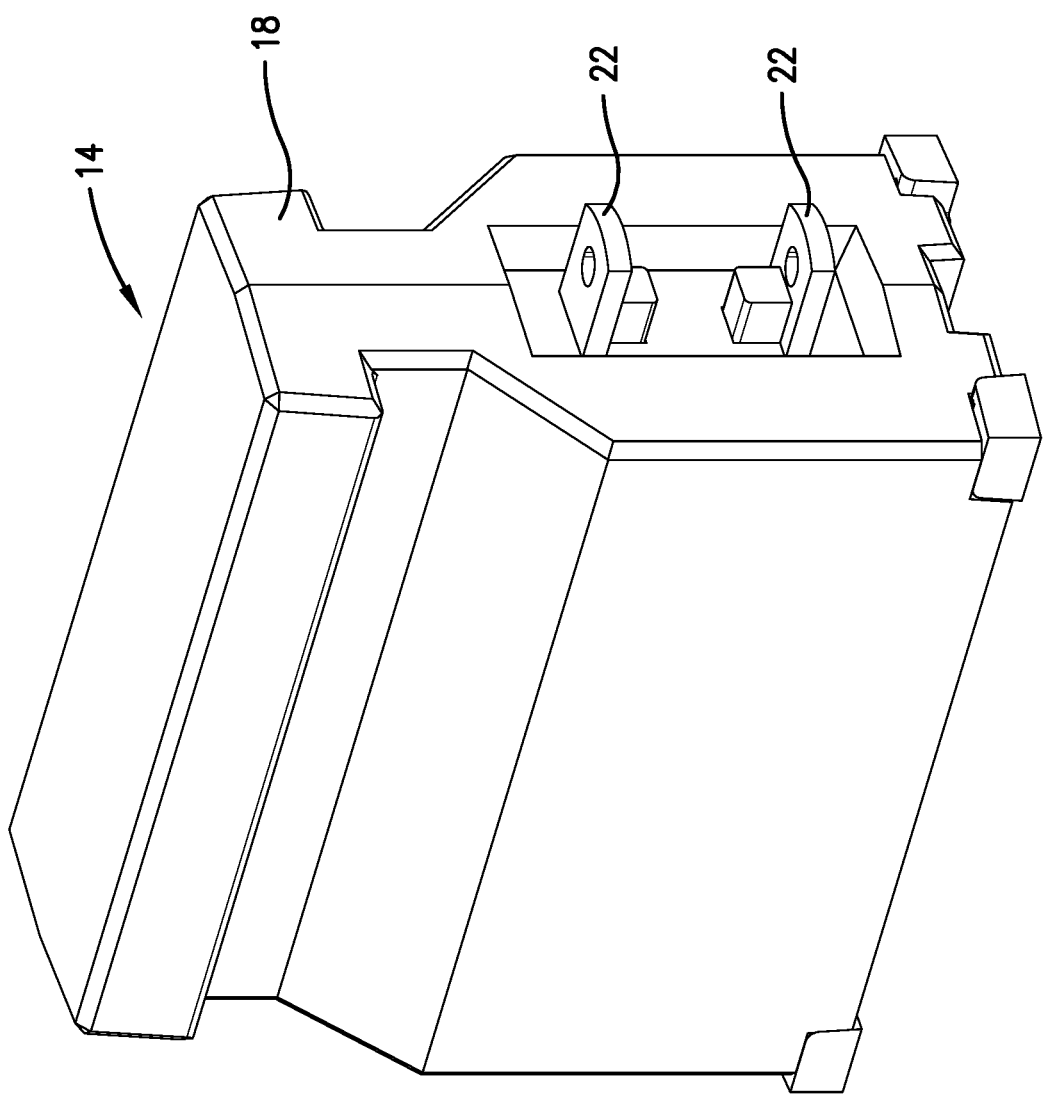
FIG. 10 is a right side perspective view of a fixed road barrier.
Figure 11:
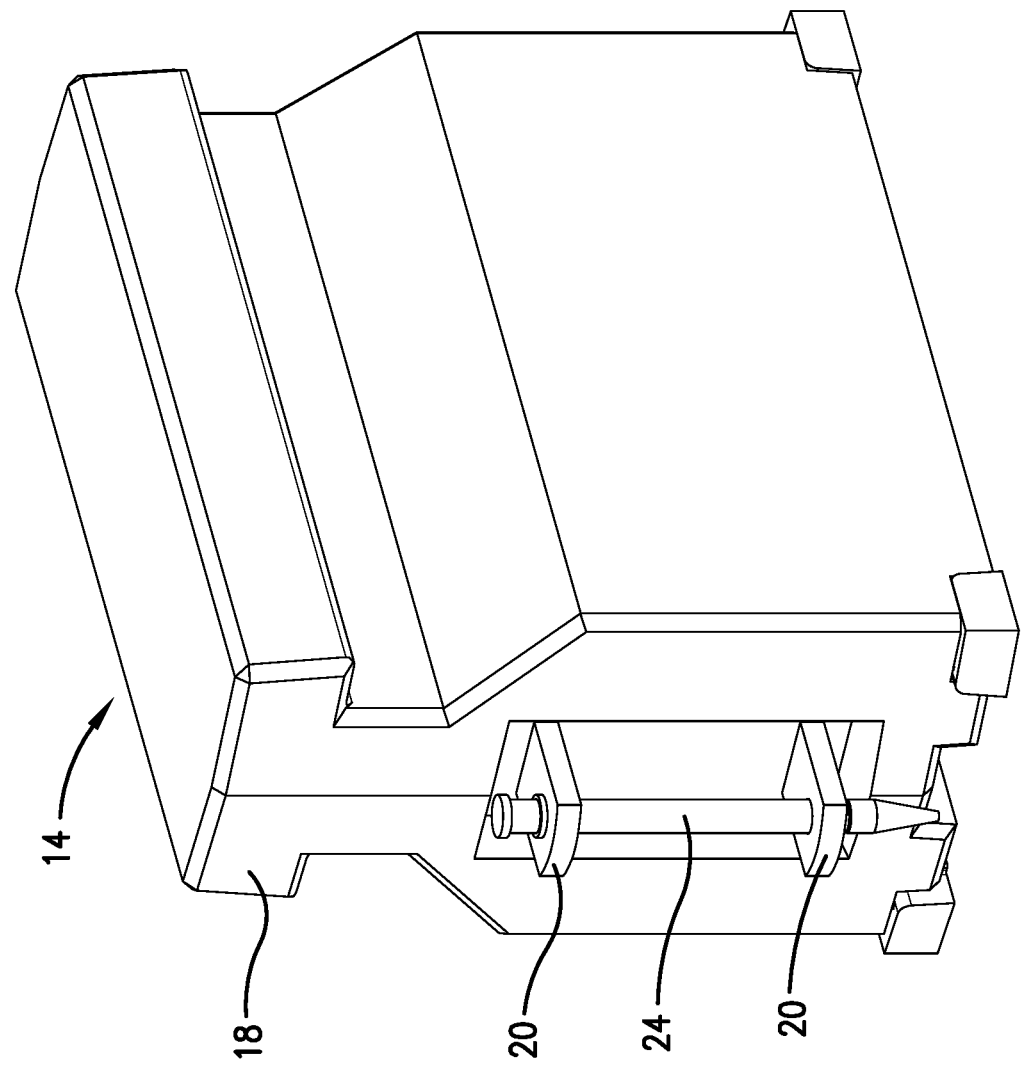
FIG. 11 is a left side perspective view of the fixed road barrier.

Examples of the fixed length barriers 14 are shown in FIGS. 10 and 11. The barriers 14 may be any type, shape, and size and may be formed of any suitable materials such as heavily reinforced concrete or high strength steel frames filled with concrete. In one embodiment, the barriers 14 have T-shaped tops 18 so they can be picked up and repositioned by bogey wheels of the barrier transfer machine as shown in FIG. 9 and described below.

Returning to FIGS. 10 and 11, one side of each barrier 14 includes fixed, spaced apart, connection flanges 20, and the opposite side includes spaced apart, spring biased, reactive tension elements 22. A steel rod 24 may be inserted through holes in the flanges 20 and tension elements 22 of adjacent barriers when they are aligned to interconnect the adjacent barriers. The reactive tension elements 22 allow adjacent barriers to move longitudinally relative to one another when the barriers are under tension or compression. In other embodiments, the fixed length barriers may not have reactive tension elements, but instead may have larger holes in the connection flanges that create "sloppy hinges" to accommodate some longitudinal movement between adjacent barriers.

Figure 12:
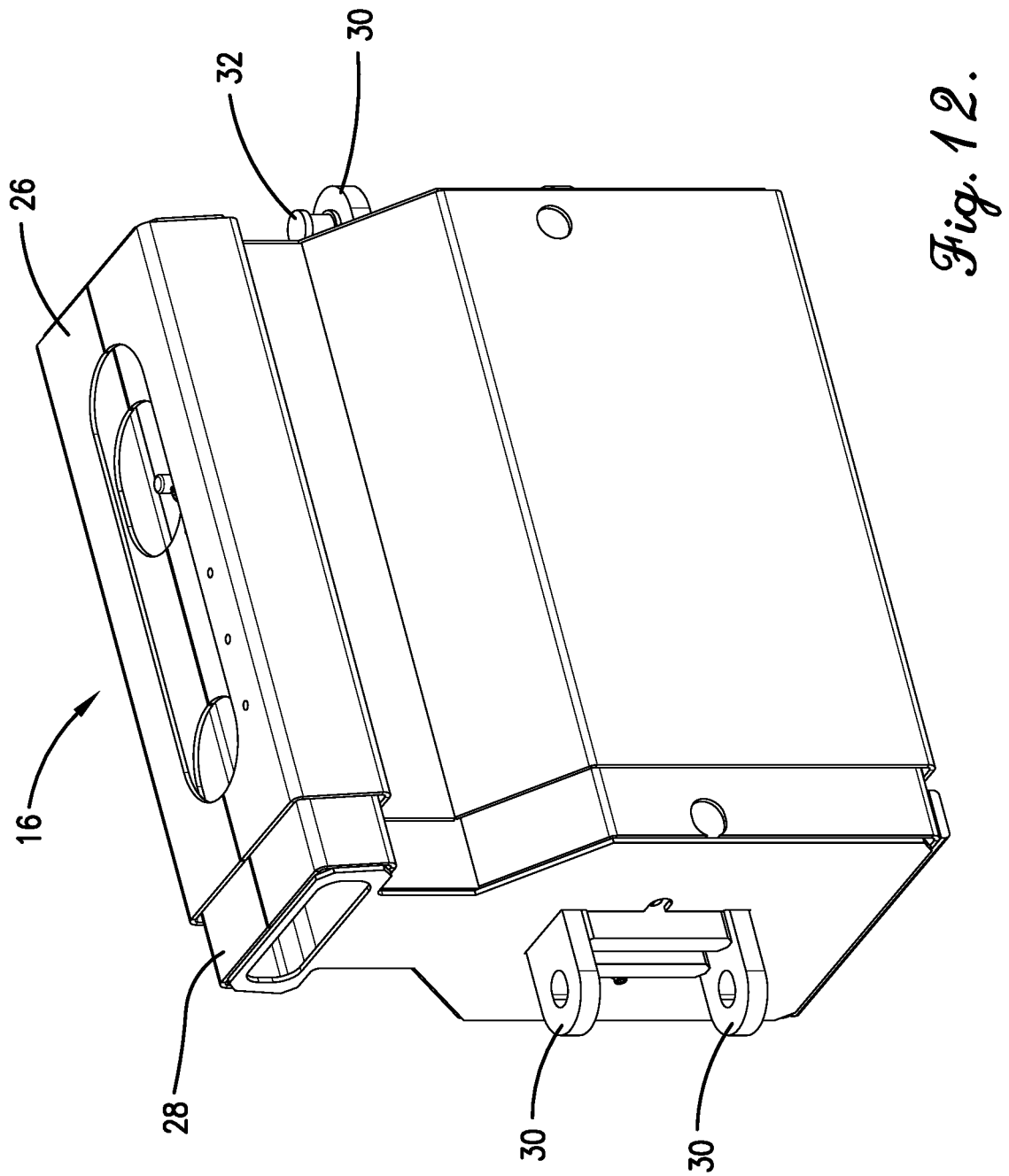
FIG. 12 is a perspective view of a variable length road barrier shown in its retracted position.
Figure 13:
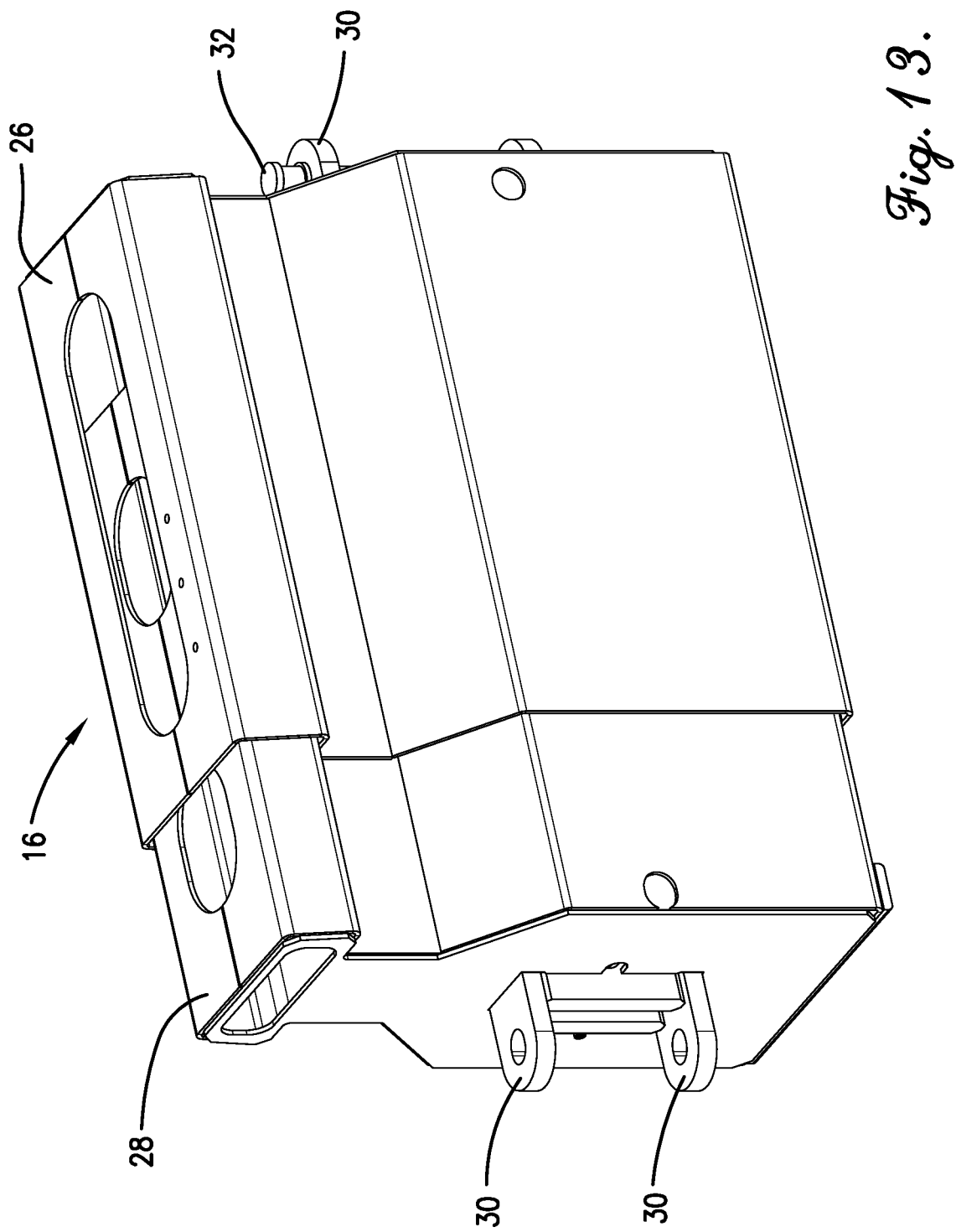
FIG. 13 is a perspective view of the variable length road barrier shown in its mid-stroke or neutral position.
Figure 14:
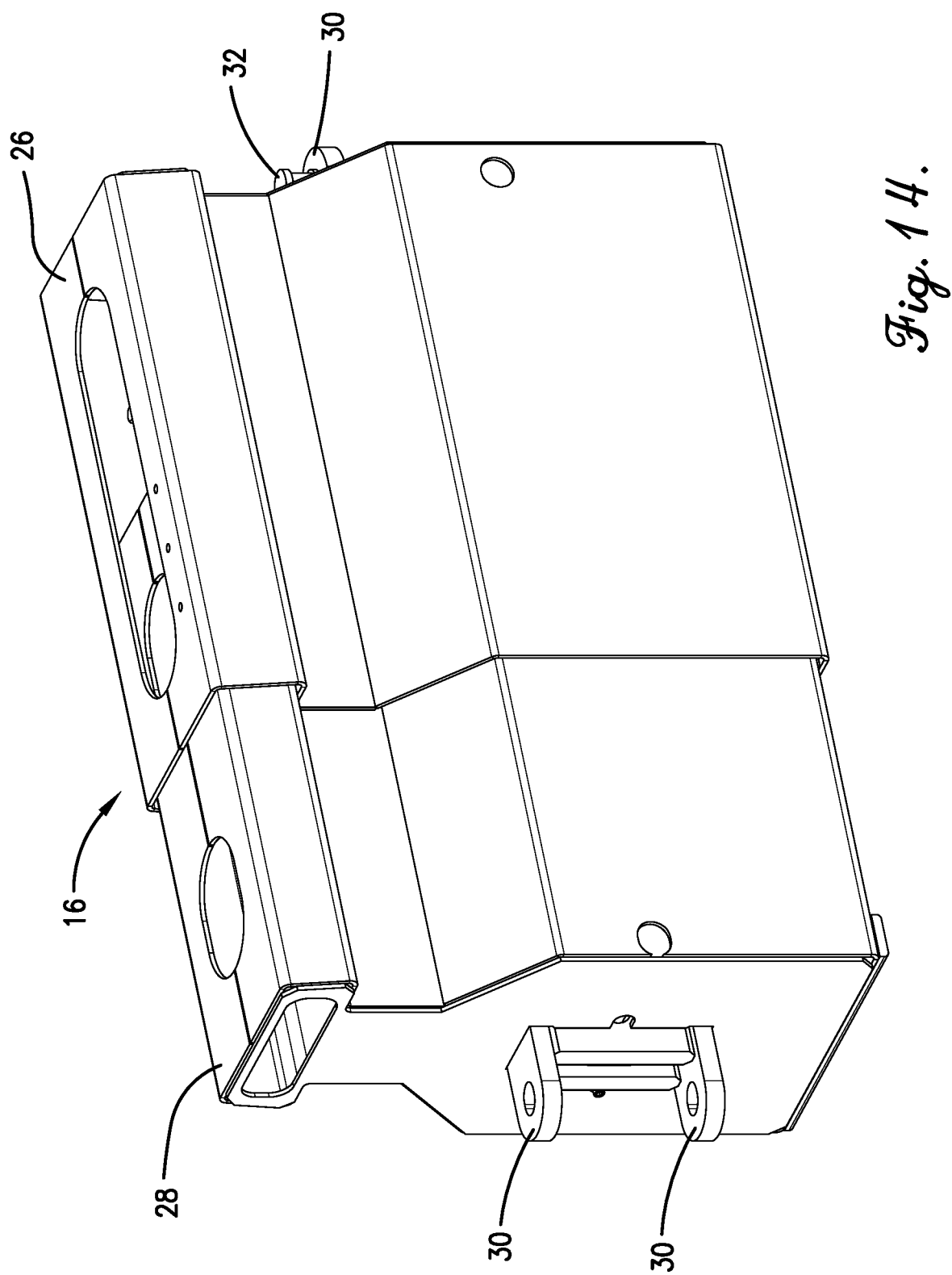
FIG. 14 is a perspective view of the variable length road barrier shown in its fully extended position.

Examples of the variable length barriers 16 are shown in FIGS. 12-14. The barriers may be any shape and size and each has an outer frame 26 and an inner telescoping structure 28 that may move in and out of the outer frame 26 when the barrier is subjected to tension or compression forces. The variable length barriers also include connection flanges 30 that may be aligned with and interconnected to the connection flanges of adjacent barriers with a steel rod 32. Movement of the telescoping inner structure 28 is resisted by internal hydraulic cylinders or other hydraulic or spring mechanisms.

FIG. 12 shows a variable length barrier 16 in its fully retracted or compressed state when subjected to a compressive force of a magnitude sufficient to fully compress the hydraulic cylinders or other biasing mechanisms. FIG. 14 shows the barrier 16 in its fully extended state when subjected to a tension force of a magnitude sufficient to fully extend the hydraulic cylinders or other biasing mechanisms. FIG. 13 shows the barrier in its neutral or steady state when it is not subjected to a compressive or tension force. More details of exemplary embodiments of variable length barriers are disclosed in U.S. Pat. No. 6,439,802, which is incorporated into the present application by reference in its entirety.

Aspects of the barrier transfer machine 10 will now be described in more detail with reference to FIGS. 1-9 and 16. An embodiment of the barrier transfer machine 10 broadly comprises a moveable chassis 34, an entry snout 36, an entry snout positioning mechanism 37, an exit snout 38, a conveyor system 40, a capstan system 42, and a control system 44 for aligning the machine with road barriers before the barriers are picked up.

The chassis 34 has a forward end and a rearward end disposed along a generally longitudinal axis that is essentially parallel to a roadway over which the machine is driven. The chassis 34 rides on wheels 46, belts, or other ground-engaging traction elements that are driven by conventional engines, transmissions, and associated mechanical and electrical components.

In one embodiment, the barrier transfer machine 10 is equipped with two cabs 48, 50, one at each end of the chassis 34. The machine 10 can be driven in either direction, but typically only one operator in one of the cabs can be in charge of the key controls at any one time. Usually the cab in control is the cab at the end of the machine pointing towards the direction in which the machine is traveling. In some embodiments, the barrier transfer machine 10 may include various sensors and controls that provide autonomous operation without direct operator control or semi-autonomous operation with some operator control.

The entry snout 36 is mounted on a front end of the chassis and is configured for picking up the road barrier span from a first location on a road surface. Likewise, the exit snout 38 is mounted on the rear end of the chassis for placing the span back onto the road surface in a second location different from the first location. The snouts 36, 38 act as guides for the road barriers as they are picked up and/or dropped off and can be moved and adjusted by operators of the machine to align the snouts with the incoming road barriers and the desired placement positions. Each snout 36, 38 includes a blunderbuss assembly 51 and an array of bogey assemblies 52. Each bogey assembly 52 comprises a number of carrier wheels 54 that pick up, carry, and/or lay down the barriers depending on the direction of travel of the machine.

Figure 16:
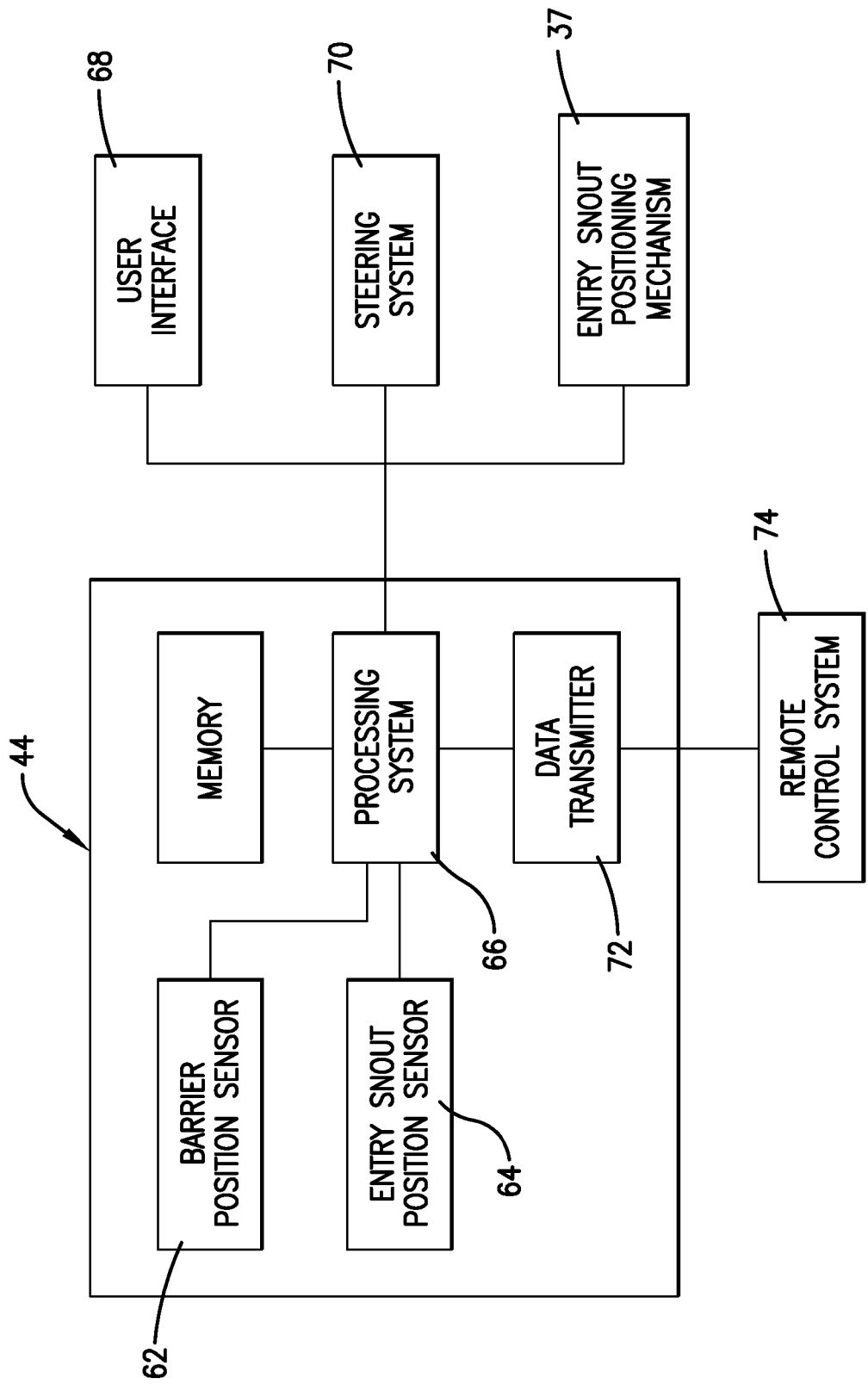
FIG. 16 is a block diagram depicting components of a control system of the barrier transfer machine.

The entry snout positioning mechanism 37 is shown schematically in FIG. 16 and is operable to shift the entry snout 36 laterally from side-to-side with respect to the longitudinal axis of the machine 10 so as to align the entry snout with the barriers before they are picked up. An embodiment of the entry snout positioning mechanism 37 may include linear actuators, hydraulic cylinders, electric motors, or other mechanisms or combinations of mechanisms for shifting the blunderbuss 51 of the entry snout from side-to-side. In some embodiments, the entry snout positioning mechanism 37 may be controlled by a joystick or other control system in one or both the cabs of the machine. In other embodiments, the entry snout positioning mechanism may be controlled automatically by the control system 44 or by a remote operator via the remote control system 74 described below.

Figure 5:
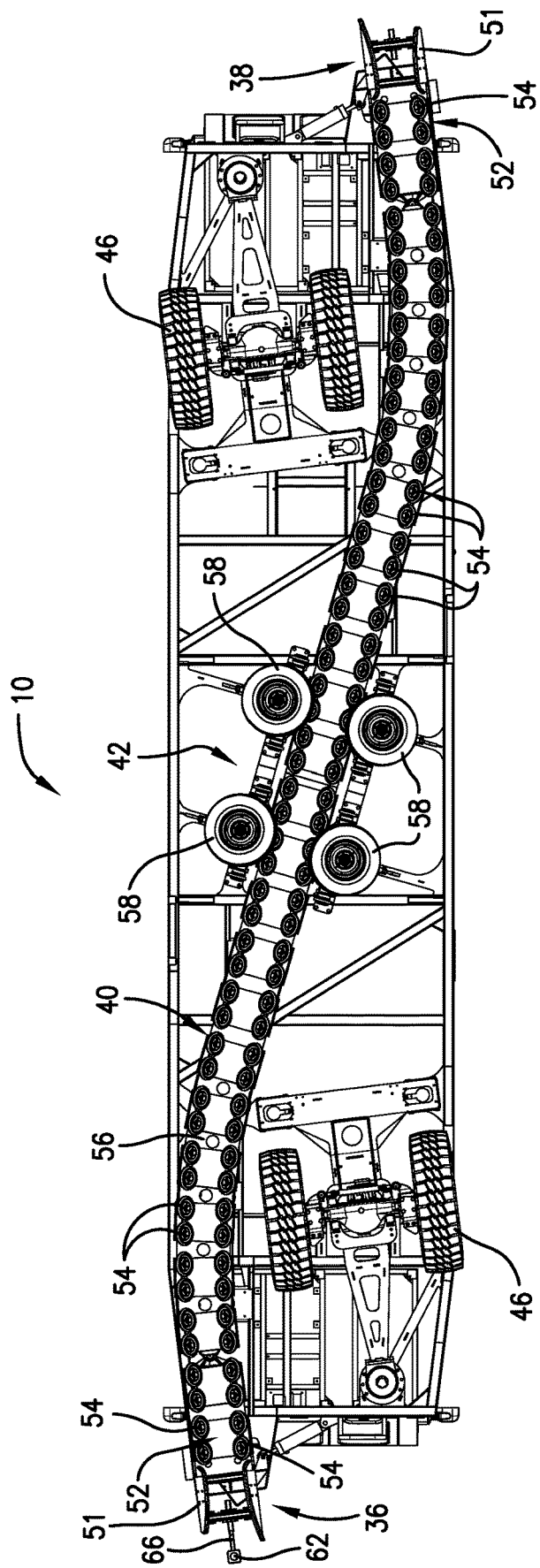
FIG. 5 is a bottom view of the barrier transfer machine.

The conveyor system 40 extends beneath the barrier transfer machine and is configured for transporting the span of road barriers from the entry snout 36 to the exit snout 38. The conveyor system 40 may be comprised of multiple assemblies and sections including straight sections, turn sections, and pickup/laydown sections connected to the snouts 36, 38. As best shown in FIG. 5, an embodiment of the conveyor system 40 comprises an S-shaped or otherwise curved structural frame 56 attached to the bottom of the machine and an array of bogey assemblies 52 supported to the frame. Each bogey assembly 52 comprises a number of carrier wheels 54 that pick up and carry the barriers through the machine during a barrier transfer operation.

The capstan system 42 is mounted alongside the conveyor system 40 and adjusts the tension or compression in the road barrier span 12 while it is being transported by the conveyor system in an attempt to keep the barrier span in its original longitudinal location relative to the road. As best shown in FIGS. 5 and 9, an embodiment of the capstan system 42 comprises a pair of large capstan wheels 58 on each side of the conveyor system, hydraulic cylinders, linkages, or other mechanisms 60 for urging the wheels against the road barriers as they pass by, and motors and pumps for driving the wheels so as to apply varying forward and rearward pressures on the road barriers. The capstan system 42 works by clamping the barriers with the capstan wheels 58 as they pass by on the conveyor system 42 and applying either forward or backward rotational pressure on the barriers. This alleviates excessive tension or compression in the span to reduce barrier migration and/or to reposition the barriers relative to one another.

Embodiments of the control system 44 will now be described in more detail with reference to FIG. 16. The control system 44 aligns the entry snout 36 with the barriers 12 before the barriers are picked up so the barriers don't rub against the carrier wheels on the entry snout or otherwise cause wear and damage to the entry snout and/or the barriers themselves. An embodiment of the control system broadly comprises a barrier position sensor 62; an entry snout position sensor 64; and a processing system 66. The control system 44 may be a stand-alone system or may be incorporated in other control systems of the barrier transfer machine.

The barrier position sensor 62 senses a position of at least one of the road barriers 12 (typically the forwardmost barrier) before the road barriers are picked up by the entry snout 36 and generates corresponding barrier position data. In some embodiments, the barrier position sensor is a light detection and ranging (LIDAR) sensor and/or a radio detection and ranging (RADAR) sensor mounted on an extension arm 66 that extends forward of the entry snout. In other embodiments, the barrier position sensor 62 may be a camera mounted on the entry snout or any other device or mechanism operable to sense the position or relative position of at least one of the barriers and generate corresponding position data. As used herein, the "position" of the barrier may be its geographical coordinates, its relative position with respect to the entry snout, and/or its angle with respect to the entry snout.

The entry snout position sensor 64 senses a position of the entry snout 36 before the road barriers are picked up and generates corresponding entry snout position data. In some embodiments, the entry snout position sensor 64 is a proximity switch, a magnetic position sensor, a potentiometer, a mechanical resolver, or a mechanical encoder operatively coupled with the entry snout positioning mechanism 37, but it may be any sensor or other mechanism capable of sensing the position or relative position of the entry snout before the barriers are picked up by the machine. As used herein, the "position" of the entry snout may be its geographical coordinates, its relative position with respect to the barriers, and/or its angle with respect to the barriers.

The processing system 66 is coupled with the barrier position sensor 62 and entry snout position sensor 64 by wired or wireless connections and receives and compares the entry snout position data to the barrier position data to determine if the entry snout is aligned with the barriers before the barriers are picked up by the entry snout. In some embodiments, the processing system comprises the entry snout position data to the barrier position data and determines the entry snout is not aligned with the barriers if the entry snout is not centered over a line extending through the length of the leading most barrier.

In some embodiments, the processing system 66 generates an alert if the entry snout 36 is not aligned with the barriers 12 and transmits the alert to a user interface 68 in the barrier transfer machine so that an operator of the machine may correct any mis-alignment between the entry snout and the barriers before the barriers are picked up. In some embodiments, the processing system 66 only generates an alert signal if it determines the misalignment between the entry snout and the road barriers is greater than a threshold amount. The threshold amount may be user-selected and may vary depending on a number of factors such as a speed of the machine, a position of the machine, and/or a position of the barriers. For example, the threshold may be greater when the machine is moving slower and/or the barricades are out of alignment due to a collision.

In other embodiments, the processing system 66 generates and transmits a control signal to automatically control the entry snout positioning mechanism 37 to correct any misalignment between the entry snout and the barriers before the barriers are picked up.

In still other embodiments, the processing system 66 generates and transmits a steering signal to the user interface 68 to prompt an operator to steer the barrier transfer machine to align the entry snout with the barriers. In other embodiments, the processing system 66 generates and transmits a steering signal to an automatic steering mechanism 70 to automatically steer the barrier transfer machine to align the entry snout with the barriers.

In other embodiments, the processing system 66 may both steer the machine 10 and controls the entry snout positioning mechanism 37. For example, the processing system 66 may first generate and transmit a steering signal to the steering mechanism 70 to steer the barrier transfer machine to roughly align the entry snout with the barriers and then generate and transmit a control signal to the entry snout positioning mechanism 37 to more precisely align the entry snout with the barriers.

The control system 44 may also comprise a data transceiver 72 for transmitting the entry snout position data, the barrier position data, and other data to a remote control system 74 and for receiving control instructions and/or data from the remote control system so that the entry snout positioning mechanism 37 and/or the steering system 70 may be controlled remotely. The data transceiver 72 may be any device capable of transmitting and receiving data via wired or wireless connections. The data transceiver may be, or include, a wired or wireless network adapter or a wireless data transceiver for use with Bluetooth communication, radio frequency (RF) communication, near field communication (NFC), and/or with a mobile phone network, Global System for Mobile communications (GSM), 3G, or other mobile data network, and/or Worldwide Interoperability for Microwave Access (WiMAX) and the like.

In another embodiment, the relative position of the barriers versus the entry snout may be determined by a load cell or other force measuring sensor positioned in or near the snout that senses the magnitude and direction of forces applied on the entry snout by the incoming road barriers. The processing system monitors the output of the force measuring sensor to determine if the entry snout is aligned with the barriers and may also determine the direction and magnitude of the mis-alignment. In one embodiment, the processing system compares the current forces applied to the entry snout to a threshold force and determines the entry snout and barriers are out of alignment if the current forces exceed the threshold force. The threshold force may be determined by measuring the forces applied on the entry snout by the incoming road barriers during a "test run" during which the entry snout is aligned with the incoming road barriers. The direction of any misalignment may be detected by one or more force measuring sensors that sense the magnitude of forces applied to both sides of the entry snout by the incoming road barriers. If the processing system determines the forces applied to one side of the entry snout are greater than the forces applied to the opposite side, the processing system determines the entry snout needs to be moved toward the side with less forces applied to it.

Figure 17:
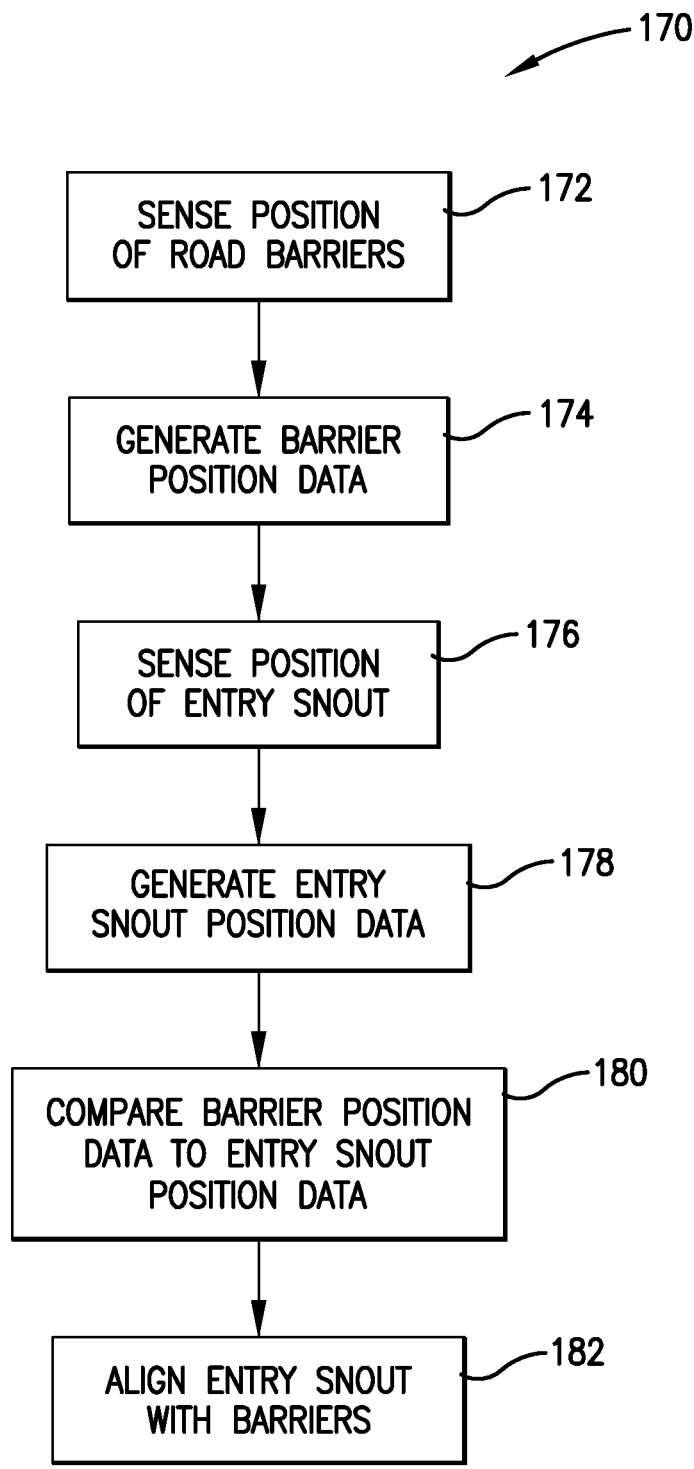
FIG. 17 is a flow diagram depicting exemplary steps of a method of the present invention.

Another embodiment of the invention is a method 170 of moving road barriers with a barrier transfer machine such as the one described and illustrated herein. The flow chart of FIG. 17 shows exemplary steps in an embodiment of the method 170. In some alternative implementations, the steps or functions noted in the various blocks may occur out of the order depicted in FIG. 17. For example, two blocks shown in succession in FIG. 17 may in fact be executed substantially concurrently, or the blocks may sometimes be executed in the reverse order depending upon the functionality involved.

An embodiment of the method 170 comprises sensing a position of road barriers before they are picked up by a barrier transfer machine as depicted in box 172. In some embodiments, the above-described barrier position sensor 62 senses the position of a leading one of the road barriers 12 before the road barriers are picked up by the entry snout 36 of the barrier transfer machine.

The method further comprises generating barrier position data corresponding to the position of the road barrier as depicted in box 174.

The method further comprises sensing a position of the entry snout before the road barriers are picked up as depicted in box 176. In some embodiments, the above-described entry snout position sensor 64 senses the position of the entry snout before the road barriers are picked up by the entry snout 36.

The method further comprises generating entry snout position data corresponding to the position of the entry snout as depicted in box 178.

The method further comprises comparing the entry snout position data to the barrier position data to determine if the entry snout is aligned with the barriers before the barriers are picked up by the entry snout as depicted in box 180.

The method further comprises aligning the entry snout with the barriers to correct any misalignment as depicted in box 182.

The aligning step may comprise generating an alert if the entry snout is not aligned with the barriers and transmits the alert to a user interface in the barrier transfer machine so that an operator of the machine may correct any mis-alignment between the entry snout and the barriers before the barriers are picked up.

Alternately, or in addition to, the aligning step may comprise controls the entry snout positioning mechanism to automatically shift the entry snout laterally to correct any misalignment between the entry snout and the barriers before the barriers are picked up.

Alternately, or in addition to, the aligning step may comprise generating transmitting a steering signal to the user interface to prompt an operator to steer the barrier transfer machine to align the entry snout with the barriers.

Alternately, or in addition to, the aligning step may comprise generating and transmitting a steering signal to an automatic steering mechanism to automatically steer the barrier transfer machine to align the entry snout with the barriers.

The method may also comprise transmitting the entry snout position data and the barrier position data and other data to the remote control system 74 and receiving control instructions at the processing system from the remote control system 74.

The method may also comprise some or all of the following steps: picking up the road barriers from a road surface; transporting the road barriers in the barrier transfer machine; and placing the road barriers back onto the road surface.

Additional Considerations

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the current technology can include a variety of combinations and/or integrations of the embodiments described herein.

Although the present application sets forth a detailed description of numerous different embodiments, the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as computer hardware that operates to perform certain operations as described herein.

In various embodiments, computer hardware, such as the processing system 66, other processing elements, etc., may be implemented as special purpose or as general purpose. For example, the processing system 66 may comprise dedicated circuitry or logic that is permanently configured, such as an application-specific integrated circuit (ASIC), or indefinitely configured, such as an FPGA, to perform certain operations. The processing system 66 also comprise programmable logic or circuitry (e.g., as encompassed within a general-purpose processor or other programmable processor) that is temporarily configured by software to perform certain operations. It will be appreciated that the decision to implement the processing system as special purpose, in dedicated and permanently configured circuitry, or as general purpose (e.g., configured by software) may be driven by cost and time considerations.

Accordingly, the term "processing system" or equivalents should be understood to encompass a tangible entity, be that an entity that is physically constructed, permanently configured (e.g., hardwired), or temporarily configured (e.g., programmed) to operate in a certain manner or to perform certain operations described herein. Considering embodiments in which the processing system is temporarily configured (e.g., programmed), each of the processing elements need not be configured or instantiated at any one instance in time. For example, where the processing system comprises a general-purpose processor configured using software, the general-purpose processor may be configured as respective different processing elements at different times. Software may accordingly configure the processing element to constitute a hardware configuration at one instance of time and to constitute a different hardware configuration at a different instance of time.

Computer hardware components, such as the processing system 66, associated memory elements, processing elements, and the like, may provide information to, and receive information from, other computer hardware components. Accordingly, the described computer hardware components may be regarded as being communicatively coupled. Where multiple of such computer hardware components exist contemporaneously, communications may be achieved through signal transmission (e.g., over appropriate circuits and buses) that connect the computer hardware components. In embodiments in which multiple computer hardware components are configured or instantiated at different times, communications between such computer hardware components may be achieved, for example, through the storage and retrieval of information in memory structures to which the multiple computer hardware components have access. For example, one computer hardware component may perform an operation and store the output of that operation in a memory device to which it is communicatively coupled. A further computer hardware component may then, later, access the memory device to retrieve and process the stored output. Computer hardware components may also initiate communications with input or output devices, and may operate on a resource (e.g., a collection of information).

The various operations of example methods described herein may be performed, at least partially, by one or more processing elements that are temporarily configured (e.g., by software) or permanently configured to perform the relevant operations. Whether temporarily or permanently configured, such processing elements may constitute processing element-implemented modules that operate to perform one or more operations or functions. The modules referred to herein may, in some example embodiments, comprise processing element-implemented modules.

Similarly, the methods or routines described herein may be at least partially processing element implemented. For example, at least some of the operations of a method may be performed by one or more processing elements or processing element-implemented hardware modules. The performance of certain of the operations may be distributed among the one or more processing elements, not only residing within a single machine, but deployed across a number of machines. In some example embodiments, the processing elements may be located in a single location (e.g., within a home environment, an office environment or as a server farm), while in other embodiments the processing elements may be distributed across a number of locations.

Unless specifically stated otherwise, discussions herein using words such as "processing," "computing," "calculating," "determining," "presenting," "displaying," or the like may refer to actions or processes of a machine (e.g., a computer with a processing element and other computer hardware components) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

The patent claims at the end of this patent application are not intended to be construed under 35 U.S.C. § 112(f) unless traditional means-plus-function language is expressly recited, such as "means for" or "step for" language being explicitly recited in the claim(s).

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A barrier transfer machine for picking up and repositioning road barriers, the barrier transfer machine comprising:
   a moveable chassis having a forward and a rearward end disposed along a generally longitudinal axis;
   an entry snout supported on the forward end of the chassis for picking up the road barriers from a road surface;
   an entry snout positioning mechanism for shifting the entry snout generally laterally with respect to the longitudinal axis of the chassis so as to move the entry snout side-to-side relative to the forward end of the chassis;
   an exit snout for placing the road barriers back onto the road surface;
   a conveyor system positioned between the entry snout and the exit snout for transporting the road barrier from the entry snout to the exit snout; and
   a control system for triggering the entry snout positioning mechanism to move the entry snout side-to-side relative to the forward end of the chassis for aligning the entry snout with the barriers before the barriers are picked up, the control system comprising:
      a barrier position sensor for sensing a position of one of the road barriers before the road barriers are picked up by the entry snout and generating corresponding barrier position data;
      an entry snout position sensor for sensing a position of the entry snout and generating corresponding entry snout position data; and
      a processing system for analyzing the entry snout position data and the barrier position data to determine if the entry snout is aligned with the barriers before the barriers are picked up by the entry snout.

2. The barrier transfer machine as set forth in claim 1, wherein the processing system further generates an alert if the entry snout is not aligned with the barriers and transmits the alert to a user interface in the barrier transfer machine so that an operator of the barrier transfer machine may correct any mis-alignment between the entry snout and the barriers before the barriers are picked up.

3. The barrier transfer machine as set forth in claim 1, wherein the processing system controls the entry snout positioning mechanism to correct any mis-alignment between the entry snout and the barriers before the barriers are picked up and generates an alert if the entry snout is not aligned with the barriers.

4. The barrier transfer machine as set forth in claim 1, wherein the barrier position sensor is a light detection and ranging (LIDAR) sensor mounted on the entry snout.

5. The barrier transfer machine as set forth in claim 1, wherein the barrier position sensor is a radio detection and ranging (RADAR) sensor mounted on the entry snout.

6. The barrier transfer machine as set forth in claim 1, wherein the entry snout position sensor is a proximity switch, a magnetic position sensor, a potentiometer, a mechanical resolver, or a mechanical encoder.

7. The barrier transfer machine as set forth in claim 1, further comprising a data transmitter in communication with the processing system for transmitting the entry snout position data and the barrier position data to a remote computing device.

8. The barrier transfer machine as set forth in claim 1, wherein the processing system further generates and transmits a steering signal to the user interface to prompt an operator to steer the moveable chassis if the entry snout is not aligned with the barriers.

9. A barrier transfer machine for picking up and repositioning road barriers, the barrier transfer machine comprising:
   a moveable chassis having a forward and a rearward end disposed along a generally longitudinal axis;
   an entry snout supported on the forward end of the chassis for picking up the road barriers from a road surface;
   an entry snout positioning mechanism for shifting the entry snout generally laterally with respect to the longitudinal axis of the chassis so as to move the entry snout side-to-side relative to the forward end of the chassis;
   an exit snout for placing the road barriers back onto the road surface;
   a conveyor system positioned between the entry snout and the exit snout for transporting the road barrier from the entry snout to the exit snout; and
   a control system for aligning the entry snout with the barriers before the barriers are picked up, the control system comprising:
      a barrier position sensor mounted on the barrier transfer machine for sensing a position of one of the road barriers before the road barriers are picked up by the entry snout and generating corresponding barrier position data;

an entry snout position sensor for sensing a position of the entry snout and generating corresponding entry snout position data; and a processing system for analyzing the entry snout position data and the barrier position data to determine if the entry snout is aligned with the barriers before the barriers are picked up by the entry snout, for controlling the entry snout positioning mechanism to shift the entry snout side-to-side relative to the forward end of the chassis to correct any misalignment between the entry snout and the barriers before the barriers are picked up, and for generating an alert and transmitting the alert to a user interface if the entry snout is not aligned with the barriers.

10. The barrier transfer machine as set forth in claim 9, wherein the barrier position sensor is a light detection and ranging (LIDAR) sensor or a radio detection and ranging (RADAR) sensor mounted on the entry snout.

11. The barrier transfer machine as set forth in claim 9, wherein the entry snout position sensor is a proximity switch, a magnetic position sensor, a potentiometer, a mechanical resolver, or a mechanical encoder.

12. The barrier transfer machine as set forth in claim 9, further comprising a data transmitter in communication with the processing system for transmitting the entry snout position data and the barrier position data to a remote computing device.

13. The barrier transfer machine as set forth in claim 9, wherein the processing system further generates and transmits a steering signal to the user interface to prompt an operator to steer the moveable chassis if the entry snout is not aligned with the barriers.

14. A method of moving road barriers with a barrier transfer machine, the method comprising:

sensing a position of a leading one of the road barriers before the road barriers are picked up by an entry snout of the barrier transfer machine;

generating barrier position data corresponding to the position of the leading road barrier;

sensing a position of the entry snout before the road barriers are picked up by the entry snout;

generating entry snout position data corresponding to the position of the entry snout;

comparing the entry snout position data to the barrier position data with a processing system to determine if the entry snout is aligned with the barriers before the barriers are picked up by the entry snout; and shifting the entry snout laterally relative to a forward end of a chassis of the barrier transfer machine, under control of the processing system, to correct any misalignment between the entry snout and the barriers before the barriers are picked up.

15. The method as set forth in claim 14, further comprising the step of generating an alert and transmitting the alert to a user interface if the entry snout is not aligned with the barriers.

16. The method as set forth in claim 14, wherein the position of the leading road barrier is sensed with a light detection and ranging (LIDAR) sensor or a radio detection and ranging (RADAR) sensor mounted on the entry snout.

17. The method as set forth in claim 14, wherein the position of the entry snout is sensed with a proximity switch, a magnetic position sensor, a potentiometer, a mechanical resolver, or a mechanical encoder.

18. The method as set forth in claim 14, further comprising transmitting the entry snout position data and the barrier position data to a remote computing device.

19. The method as set forth in claim 14, further comprising generating and transmitting a steering signal to the user interface to prompt an operator to steer the barrier transfer machine if the entry snout is not aligned with the barriers.

20. A barrier transfer machine for picking up and repositioning road barriers, the barrier transfer machine comprising:

a moveable chassis having a forward and a rearward end disposed along a generally longitudinal axis;

an entry snout supported on the forward end of the chassis for picking up the road barriers from a road surface;

an entry snout positioning mechanism for shifting the entry snout generally laterally with respect to the longitudinal axis of the chassis so as to move the entry snout side-to-side relative to the forward end of the chassis;

an exit snout for placing the road barriers back onto the road surface;

a conveyor system positioned between the entry snout and the exit snout for transporting the road barrier from the entry snout to the exit snout; and a control system for aligning the entry snout with the barriers before the barriers are picked up by triggering the entry snout positioning mechanism to shift the entry snout side-to-side relative to the forward end of the chassis, the control system comprising:

a sensor for sensing a relative position of the entry snout and one of the road barriers before the road barriers are picked up by the entry snout and generating corresponding relative position data; and a processing system for analyzing the relative position data to determine if the entry snout is aligned with the barriers before the barriers are picked up by the entry snout.

* * * * *